(12) United States Patent
Shackleford et al.

(10) Patent No.: US 7,571,200 B2
(45) Date of Patent: Aug. 4, 2009

(54) SEEDABLE PSEUDO-RANDOM NUMBER GENERATOR

(75) Inventors: J. Barry Shackleford, Portola Valley, CA (US); Richard J. Carter, Los Altos, CA (US); Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 10/131,630

(22) Filed: Apr. 24, 2002

(65) Prior Publication Data

US 2003/0204541 A1 Oct. 30, 2003

(51) Int. Cl.
*G06F 1/02* (2006.01)
(52) U.S. Cl. ...................... 708/250; 708/251
(58) Field of Classification Search .......... 708/250–256
See application file for complete search history.

(56) References Cited

U.S. PATENT DOCUMENTS

| | | | | |
|---|---|---|---|---|
| 4,691,291 A | * | 9/1987 | Wolfram | 708/250 |
| 4,961,159 A | * | 10/1990 | McLeod et al. | 708/250 |
| 5,043,988 A | * | 8/1991 | Brglez et al. | 708/252 |
| 5,365,585 A | * | 11/1994 | Puhl et al. | 708/250 |
| 6,061,818 A | * | 5/2000 | Touba et al. | 708/250 |
| 6,215,327 B1 | * | 4/2001 | Lyke | 326/41 |
| 6,611,933 B1 | * | 8/2003 | Koenemann et al. | 714/726 |
| 6,735,606 B2 | * | 5/2004 | Terasawa et al. | 708/252 |
| 6,763,363 B1 | * | 7/2004 | Driscoll | 708/252 |
| 2002/0174152 A1 | * | 11/2002 | Terasawa et al. | 708/250 |

OTHER PUBLICATIONS

Tsalides et al., Pseudorandom number generators for VLSI systems based on linear cellular automata, Jul. 1991, IEEE proceedings-E vol. 138, No. 4, pp. 241-249.*
Paul Bardell, Analysis of cellular automata used as pseudorandom pattern generators, 1990, IEEE, pp. 762-768.*
Chang et al., Some properties of maximum length cellular automaton sequences, Sep. 1997, IEEE International conference on information communication and signal processing, pp. 1124-1128.*
Zhang et al., Two improved algorithms and hardware implementations for key distribution using extended programmable cellular automata, Dec. 1998, IEEE, pp. 244-249.*
P. Alfke, "Efficient shift registers, LFSR counters, and long pseudo-random sequence counters," Xilinx Application Note XAPP 052 (ver. 1.1), pp. 1-6, Jul. 7, 1996.
P. D. Hortensius, R. D. McLeod, and H. C. Card, "Parallel Number Generation for VLSI Systems Using Cellular Automata," *IEEE Transactions on Computers*, vol. 38, No. 10, pp. 1466-1473, Oct. 1989.

* cited by examiner

*Primary Examiner*—Chat C Do

(57) ABSTRACT

A seedable pseudo-random number generator. A linear feedback shift register (LFSR) arrangement is used to generate a first pseudo-random number, and a cellular automata is used to generate a second pseudo-random number. The bits of the LFSR arrangement are XORed with bits of the cellular automata to generate the output pseudo-random number.

3 Claims, 7 Drawing Sheets

SEEDABLE PSEUDO-RANDOM NUMBER GENERATOR

FIELD OF THE INVENTION

The present invention generally relates to random number generators.

BACKGROUND

High-quality random numbers have long played an important and expanding role in areas such as Monte Carlo simulations; probabilistic computing methods, for example, simulated annealing, genetic algorithms, and neural networks; computer-based gaming; and VLSI chip testing. Because the prevalent computing medium has long been the general purpose, arithmetic computer, investigation into random (more properly, pseudo-random) number generation methods has mostly centered around arithmetic algorithms. The term "random number" as used in this description is a shortened form of "pseudo-random number."

Since random number generators (RNGs) based upon arithmetic algorithms are expensive to implement with hardware, for example, ASICs or field programmable gate arrays (FPGAs), linear feedback shift registers (LFSRs) have been popular among hardware designers for implementing RNGs. A desirable property of LFSRs is the "maximal cycle length." The maximal cycle length property is where the cycle length is $2^n-1$ states (i.e., clock cycles) where n is the number of bits in the register. Even though a maximal cycle length is desirable, the random number properties of an LFSR are poor.

RNGs based upon cellular automata (CA) have the advantages of economical hardware implementation, especially when implemented on FPGAs, and highly desirable random number properties. Test batteries such as DIEHARD are commonly used to evaluate the statistical characteristics of an RNG. Known disadvantages of a CA-based RNG are: 1) the cycle length is less than the theoretical maximum for the number of bits in the CA (as compared to the LFSR RNG); and 2) as a function of the initial state of the CA, the CA-based RNG may enter into different sub-cycles, any of which could possibly be substantially shorter than the main cycle. The first disadvantage can be ameliorated to some degree by extending the length of the CA (i.e., adding cells). However, the CA RNG with additional cells must still be verified as having cycle properties of some desired length. The second disadvantage is very difficult to address because all possible starting states must be tested to detect sub-cycles.

A system and method that address the aforementioned problems, as well as other related problems, are therefore desirable.

SUMMARY OF THE INVENTION

The present invention provides a method and apparatus for generating a pseudo-random number. A first pseudo-random number is generated with a linear feedback shift register (LFSR) arrangement, and a second pseudo-random number is generated with a cellular automaton. The output pseudo-random number is generated by application of XOR functions between bits of the first pseudo-random number and bits of the second pseudo-random number. The generator exhibits the maximal cycle length property of an LFSR and desirable random properties of a cellular automaton. CA RNGs having different interconnect topologies can be employed to meet design objectives. The functions of the LFSR RNG, CA RNG, and XOR functions can be implemented in either hardware or software.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The present invention combines the desired maximal cycle length of an LFSR RNG (configured to have a maximal cycle length) with the desirable random number properties of a CA RNG. The output bits of an LFSR RNG and a CA RNG are XORed to produce a composite output value. The resulting RNG is seedable to any value, has desirable random number characteristics and has a cycle length much greater than an individual CA RNG. The cycle length of the combined RNGs is the product of the LFSR RNG cycle length and the CA RNG cycle length (assuming that the cycle lengths are relative primes). Various example embodiments include CA RNGs with different interconnect topologies and single or multiple CA RNGs.

A cellular automaton (CA) may be thought of as a dynamic system that is discrete in both time and space. A CA may be implemented as an array of cells with homogeneous functionality and constrained to a regular lattice of some dimension. For example, a one-dimensional lattice could be a string having open ends or a ring having closed ends. A two-dimensional lattice could be a plane having open ends or a toroid having closed ends. Open-ended CAs have boundaries that are fixed and close-ended CAs have boundaries that are periodic.

Each cell in a CA has a state that is updated as a function of states of neighboring cells at each time step. In other words, the state of a CA at time t depends on the states of the connected neighbors at time t−1. For a binary CA cell with a neighborhood size of N, there are $2^{2^N}$ possible implementations of the cell. Table 1 illustrates the growth in the number of possible implementations as the size of the neighborhood increases.

TABLE 1

| Neighborhood size N | # of Possible States |
|---|---|
| 1 | 4 |
| 2 | 16 |
| 3 | 256 |
| 4 | 65,536 |
| 5 | 4,294,967,296 |
| 6 | $1.84 \times 10^{19}$ |
| 7 | $3.4 \times 10^{38}$ |

Figures 1A, 1B:
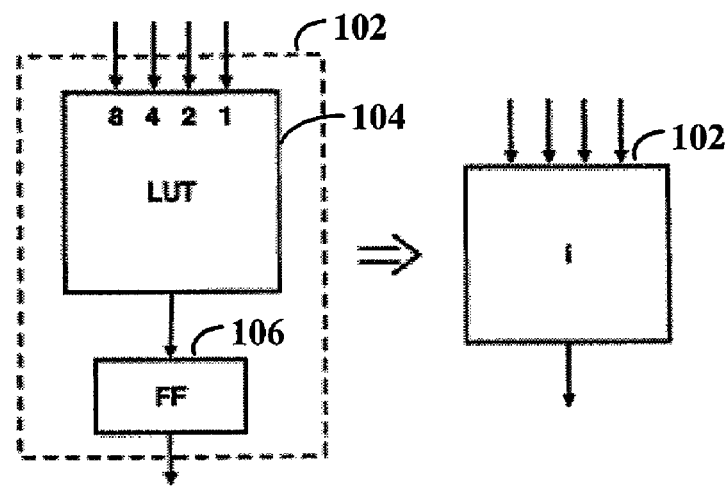
FIG. 1A shows a truth table of an example function implemented in a cell of a cellular automaton (CA) random number generator (RNG)
FIG. 1B illustrates the correspondence between example components that implement a cell of a CA and a cell of a CA.

A function of a CA cell may be represented as a truth table. FIG. 1A shows an example truth table for a four-input CA cell. FIG. 1B shows an example implementation of a cell 102 of the CA in which cell i implicitly includes a look-up table (LUT) 104 that implements the function of the cell and a one-bit register 106 that stores the state of the cell. For a cell having 4 input ports, there are 16 possible conditions to which a cell may respond. The number of possible implementations is $2^{2^4} = 2^{16} = 65,536$. In other words, there are 65,536 possible unique four-input cells.

In describing CA RNGs, two notations are useful. The first notation describes the function of each cell, and the second notation describes the interconnection between the cells. Referring back to FIG. 1A, a notation is illustrated for identification of the CA that implements the truth-table function. In essence, the output of the truth table identifies the CA. The output of the truth table is converted from base 2 to another base, for example, hexadecimal or decimal. The prefix "CA" is added to denote a cellular automaton. The CA represented by the truth table in FIG. 1A is identified as CA06990.

Figure 1C:
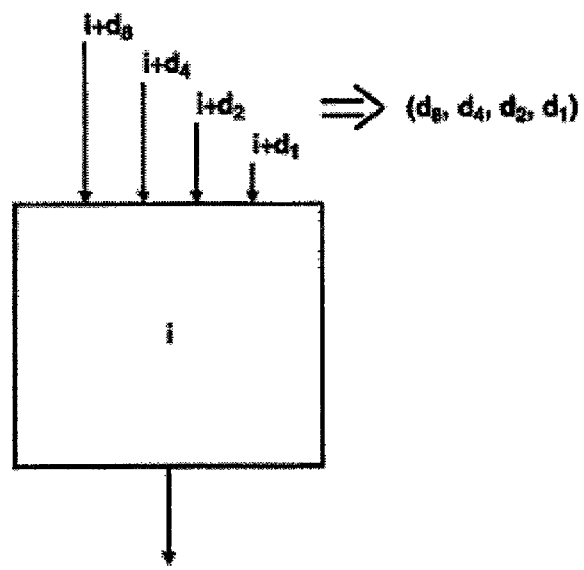
FIG. 1C illustrates a notation for an interconnect topology relative to a cell of a CA.

As described above, a CA RNG is implemented with multiple cells. The outputs of selected cells provide the inputs to other cells. The output of a cell may also be used as one of the inputs to the cell (feedback). Thus, to uniquely identify a CA RNG, the interconnection topology information is provided in addition to the functional representation. FIG. 1C illustrates an example relative displacement notation that indicates the interconnection topology information of a 4-input cell i in terms of the number of cells between cell i and the cells providing the input bit to cell i. Note that the distance separating cells assumes a lattice having some dimension greater than 1, as further explained below. The set of $d_8$, $d_4$, $d_2$, and $d_1$ are the offset values associated with the LUT-input addresses of the cell. For example, the input bit to LUT-input address 8 of cell i is provided by cell $(i+d_8)$.

With references to FIGS. 2A-2C, the effect of periodic boundary conditions on connections for one-, two-, and three-dimensional CA networks is described below. In all three examples, an example 64-cell automaton is illustrated in which the neighborhood size is assumed to be 4. Those skilled in the art will appreciate that the neighborhood size could range from 1 to as large as implementation restrictions allow. With 64 cells, the cells may be arranged as a 64×1 one-dimensional CA, an 8×8 two-dimensional CA, or a 4×4×4 three-dimensional CA. One of ordinary skill in the art will recognize that the number of cells is not limited to 64, and the number of dimensions may be more than three depending on design and implementation requirements.

Figure 2A:
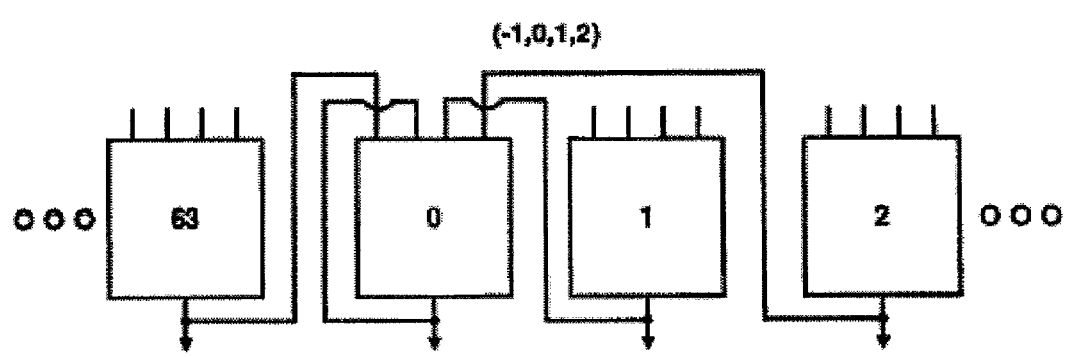
FIG. 2A illustrates an example 64-cell one-dimensional (64×1) CA interconnect topology having a periodic boundary.

FIG. 2A illustrates an example one-dimensional CA network of 64 cells and having a periodic boundary. The displacement set is (−1, 0, 1, 2). Each cell i is assumed to have the same displacement set. In a one-dimensional ring CA network, each cell has two adjacent neighbors, one on either side. Because the CA network is periodic, cell 63 is adjacent to cell 0. Thus, the displacement value i−1 for cell 0 references cell 63.

In a one-dimensional CA network, the displacement set (−1, 0, 1, 2) indicates that the $d_8$ input of cell i is connected to the output of the cell i−1 (one cell to the left), the $d_4$ input is connected to the output of cell i, the $d_2$ input is connected to the output of cell i+1, and the $d_1$ input is connected to the output of cell i+2. Thus, the inputs $d_8$, $d_4$, $d_2$, and $d_1$ of cell 0 are connected to the outputs of cell 63, cell 0, cell 1, and cell 2, respectively.

Figure 2B:
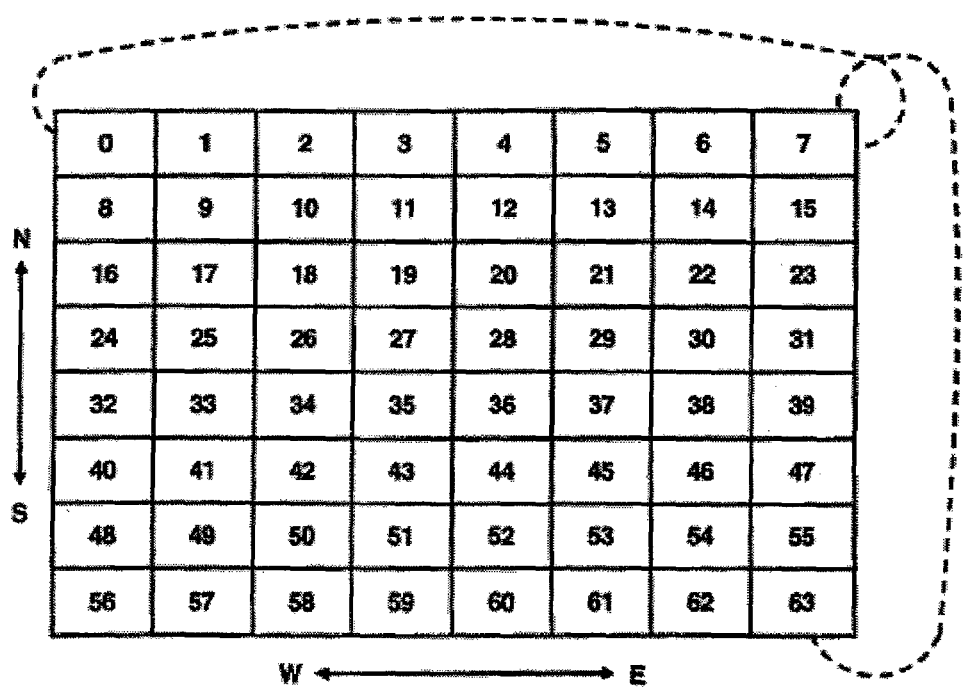
FIG. 2B illustrates an example of 64-cell two-dimensional (8×8) CA network having periodic boundaries.

FIG. 2B illustrates an 8×8 two-dimensional CA network of 64 cells and having periodic boundaries. A periodic two-dimensional CA may be visualized as a toroid. In a two-dimensional toroidal CA network, each cell i has four directly adjacent neighbors, two in each of the two dimensions. For example, cell 7 is adjacent to cells 6 and 0 in the first dimension and to cells 15 and 63 in the second dimension. The adjacency to cells 0 and 63 is due to the periodic boundaries.

For the two-dimensional CA network, compass directions N, S, E, and W (as well as combinations such as NW, NE, SW, and SE) and associated numerical values may be used to indicate the connections. For example, a displacement set for a cell in the 64-cell two-dimensional CA network may be (1NW, C, 1NE, 1S), where C indicates the cell itself. For example, relative to cell 7, the inputs addresses 8, 4, 2, and 1 would be connected to the outputs of cells 62, cell 7, cell 56, and cell 15, respectively. Those skilled in the art will appreciate that the displacements are not limited to one step in any direction.

Figure 2C:
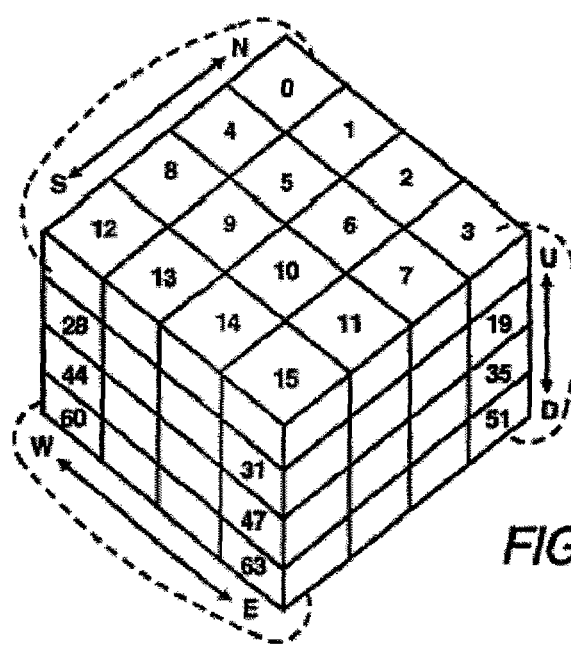
FIG. 2C illustrates an example 64-cell three-dimensional (4×4×4) CA network having periodic boundaries.

FIG. 2C illustrates a 64-cell three-dimensional CA network having periodic boundaries. In a three-dimensional periodic CA network, each cell i has six directly adjacent neighbors, two in each of the three dimensions. For example, cell 3 is adjacent to cells 2 and 0 in the first dimension, cells 7 and 15 in the second dimension, and cells 19 and 51 in the third dimension. The adjacencies to cells 0, 15, and 51 is due to the periodic boundaries. Those skilled in the art will appreciate that the displacements are not limited to one step in any direction.

Figure 3:
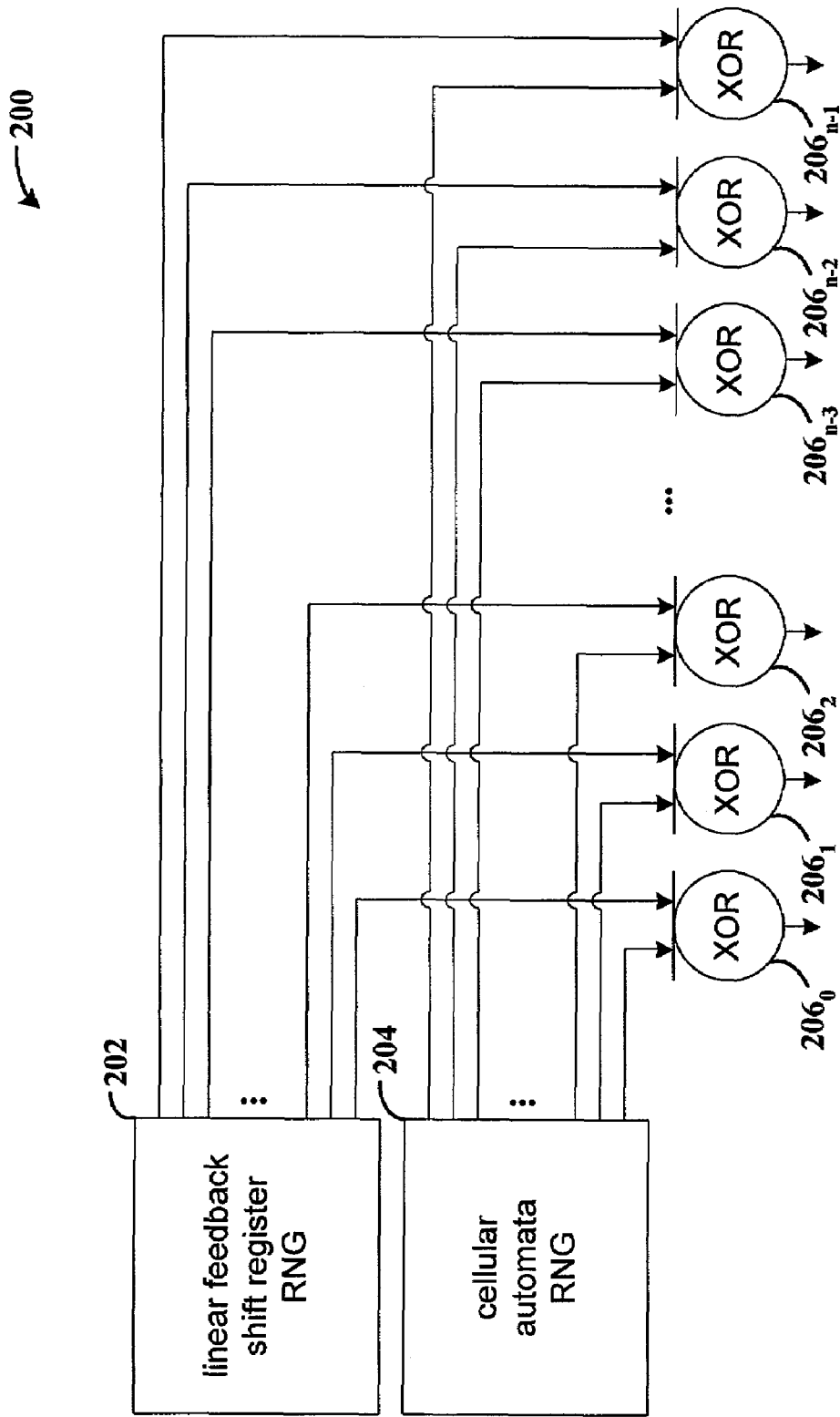
FIG. 3 is a functional block diagram of a random number generator (RNG) in accordance with one embodiment of the invention.

FIG. 3 is a functional block diagram of a random number generator in accordance with one embodiment of the invention. A composite RNG with desirable random number properties and a desirable cycle length is constructed from a first RNG with desirable random number properties and a second RNG that has a desirable cycle length but poor statistical properties. In one embodiment, an exclusive-OR (XOR) function is used to combine the output of the first and second RNGs. In another embodiment, an XNOR function can be used to combine the outputs. XOR and XNOR functions work well because they keep the composite output balanced relative to the chance of the output value being a logic 1 or a logic 0.

Random number generator 200 includes LFSR RNG 202 and CA RNG 204. The output bits of the RNGs are combined by XOR elements $206_0$-$206_{n-1}$, and the result is referenced herein as the "composite" random number, with bits denoted as $C_0$-$C_n$. The resulting stream of random numbers has the desirable random number characteristics of CA RNG 204, in addition to the desirable cycle length of LFSR RNG 202. The cycle length of the composite is equal to the product of the relatively prime cycle lengths of LFSR RNG 202 and CA RNG 204. The LFSR RNG can be seeded with any value that does not reduce the LFSR cycle length to less than the maximal cycle length (e.g., all 0s or all 1s), and the CA RNG can be seeded with any value that does not result in a sub-cycle. If the CA RNG is seeded with a value that has been verified (to some degree) to not result in a sub-cycle, then the LFSR can be seeded to essentially any value thereby making the combined RNG seedable while maintaining the maximal cycle length.

In another embodiment, XNOR elements can be substituted for the XOR elements without loss of the desired random number and cycle length properties. Because the XNOR function is the negation of the XOR function, in some embodiments XOR elements serve as the basis for both the XOR and XNOR implementations.

The equation for determining the maximal cycle length of an LFSR ($2^n-1$) is analogous to the equation for Mersenne prime numbers, which provides an easy way to select the number of stages in the LFSR RNG. Prime numbers that take the form $2^p-1$ are referred to as Mersenne primes. Note that this equation is of the same form as the equation for the maximal cycle length of an LFSR RNG. Thus, if the size of the LFSR RNG is selected to be equal to the p value of a Mersenne prime, the maximal cycle length of the LFSR RNG will be known to be a prime number, and by implication the cycle lengths of the LFSR RNG and CA RNG will be relative prime numbers.

Figure 4:
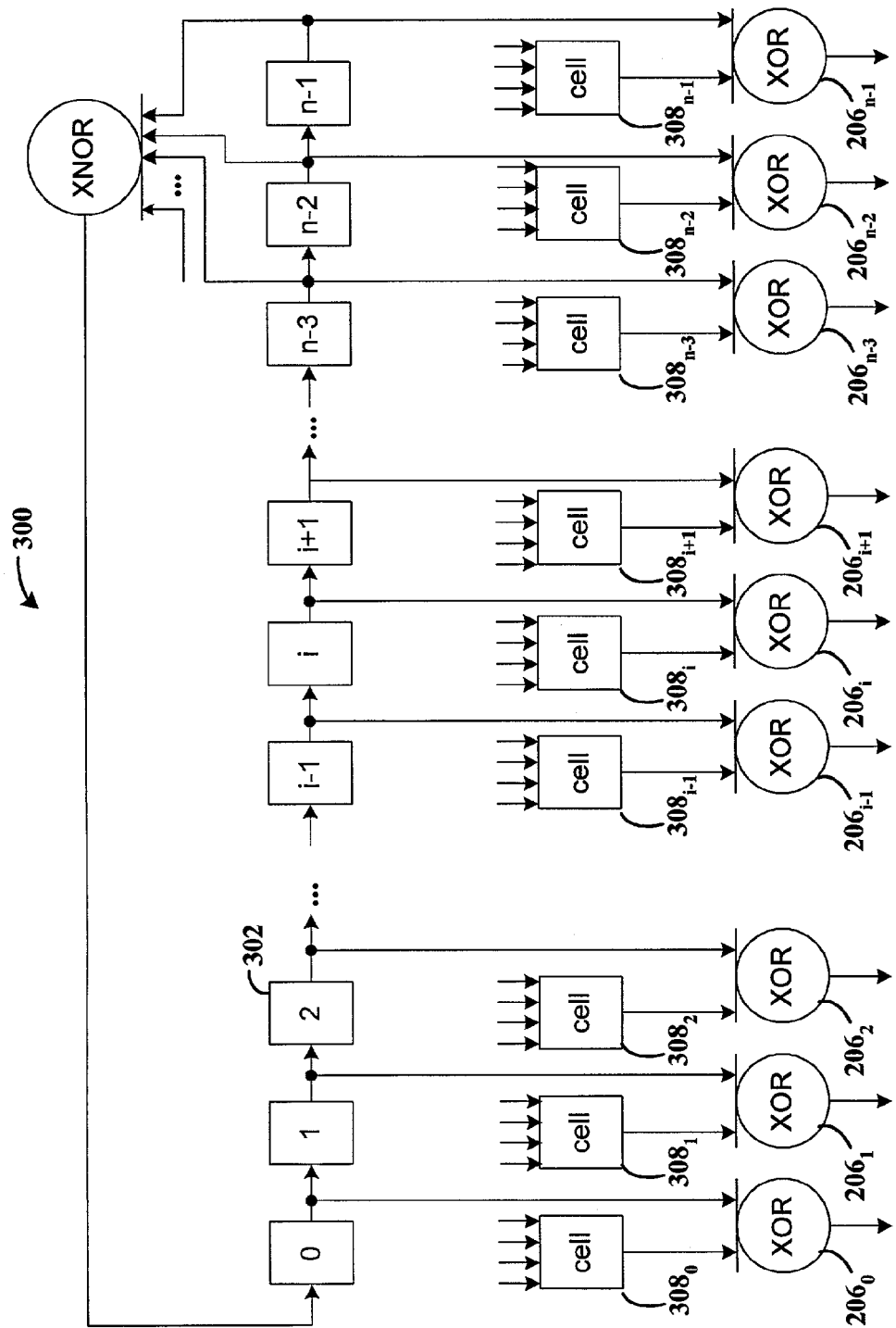
FIG. 4 illustrates a specific example of a random number generator that includes a linear feedback shift register (LFSR) RNG and a CA RNG.

FIG. 4 illustrates specific example of a random number generator 300 that includes an LFSR RNG and a CA RNG. The example LFSR includes n stages, numbered 0 through n−1. For example block 302 represents stage 2 of the LFSR. Output bits from selected ones of the stages are input to XNOR element 304, which generates the bit that is fed back for input to stage 0. It will be appreciated that the feedback term for an LFSR need not be generated from a group of contiguous bits. Thus, although the last (right-most when shifting right) bit will always be used, the next-to-last bit may or may not be used, depending on design and implementation requirements. In addition, an XOR element may be substituted for the XNOR function without affecting the cycle length or random number properties of the LFSR RNG. Those skilled in the art will also appreciate that the particular hardware and circuit technology in which the LSFR is implemented depends on design and implementation requirements. An example implementation that provides flexibility is an FPGA.

The output bits from the stages 0 through n−1 are provided as input bits to XOR elements $206_0$-$206_{n-1}$, along with output bits from the cells $308_0$-$308_{n-1}$, of the CA RNG. The interconnect topology of cells $308_0$-$308_{n-1}$ is selected based on design and implementation requirements. For example, any of the one-, two-, or three-dimensional CA RNGs described above may be suitable for the RNG 300, depending on design and implementation requirements.

Example RNG 300 has bits of the LFSR RNG being combined like numbered bits of the CA RNG, which simplifies a software implementation. In an alternative embodiment, non-corresponding bits of the LFSR RNG and CA RNG are combined. For example, instead of combining stage 0 and cell $308_0$, stage 0 could be combined with any of the other cells $308_1$-$308_{n-1}$. In yet another embodiment, the LFSR RNG and the CA RNG may have different numbers of bits, provided that both the CA RNG and the LFSR RNG have lengths equal to or greater than the required bit length of the composite RNG. Subject to implementation restrictions and available resources, the LFSR RNG allows the composite RNG to be extended to an arbitrarily long bit length. This allows maximizing the cycle length, while retaining the desired random properties provided by the CA RNG.

Figure 5:
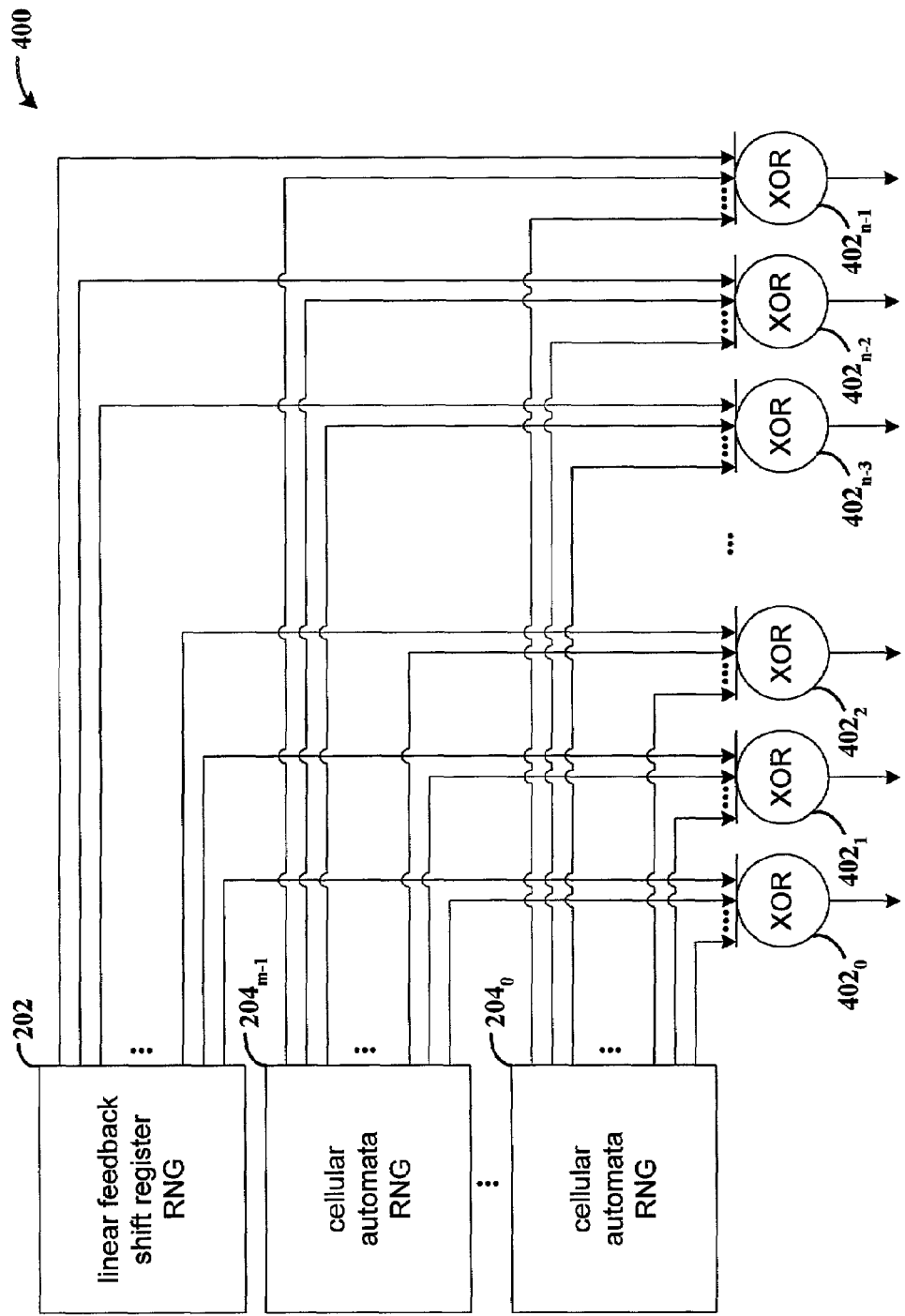
FIG. 5 is a functional block diagram of an RNG in accordance with another embodiment of the invention.

FIG. 5 is a functional block diagram of an RNG 400 in accordance with another embodiment of the invention. RNG 400 includes an LFSR RNG 202 and multiple CA RNGs $204_0$-$204_{m-1}$. The XOR elements $402_0$-$402_{n-1}$ have multiple input ports for combining the output bits from the LFSR RNG 202 and the CA RNGs $204_0$-$204_{m-1}$. Where the number of input bits to an XOR circuit is greater than 2, the output of the XOR circuit is a logical 1 bit when the number of input bits equal to logical 1 is odd, and the output is a logical 0 bit when the number of input bits equal to logical 1 is even.

The LFSR RNG 202 may be implemented in accordance with any of the previously described embodiments. The CA RNGs may also be implemented as described above. The CA RNGs need not have the same interconnect topology. Furthermore, corresponding bits of the LFSR RNG and CA RNGs need not be provided as input to the XOR elements.

Figure 6:
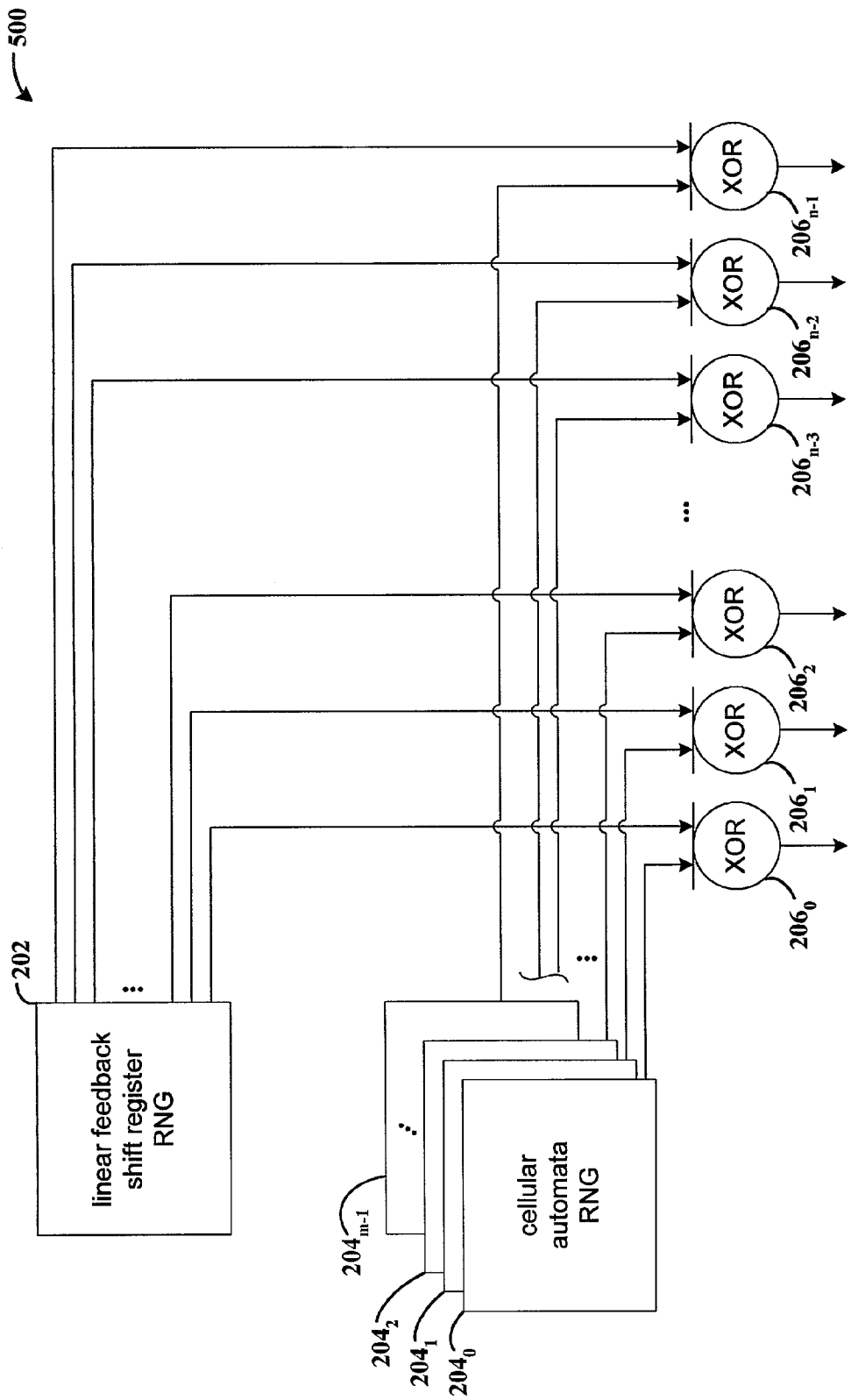
FIG. 6 is a functional block diagram of another example embodiment of an RNG in accordance with the invention.

FIG. 6 is a functional block diagram of an RNG 500 in accordance with another embodiment of the invention. RNG 500 includes LFSR RNG 202 and multiple CA RNGs $204_0$-$204_{m-1}$. Different selected bits of the multiple CA RNGs are combined with bits of selected stages of the LFSR RNG. A selected bit from one of the CA RNGs is provided to an XOR element, along with a bit from a selected stage of the LFSR RNG. For example, the bit from cell, from CA RNG $204_j$ ($0<=j<=m-1$) and the bit from stage$_k$ of the LFSR are provided as input to XOR $206_0$. Note that a single CA RNG may be tapped to provide input bits from multiple cells to multiple ones of the XOR elements, respectively. The total number of bits provided by the set of CA RNGs and connected to the XOR elements must be n for an n-bit composite random number. It will be appreciated that an example implementation may have multiple CA RNGs with each CA RNG having fewer than n bits, provided that a total of n bits from the CAs are combined with bits from stages of the LFSR RNG and depending on the characteristics of the CAs.

In all embodiments, the XORing of the output of a stage of the LFSR RNG and a cell of the CA RNG need not be between corresponding bits of the LFSR RNG and the CA RNG. For example, the inputs to the XOR circuit that provides bit 0 of the output random number may be connected to the output of a stage other than stage one of the LFSR RNG and connected to an output of a cell(s) other than cell 1 of the CA RNG.

The various configurations of random number generators described herein may be implemented in either hardware or software or various combinations thereof. The invention is suitable for ASIC or programmable logic implementations. The look-up table structures and programmable capabilities of FPGAs (for example, from Xilinx) are particularly useful for implementing the LFSR RNG, the CA RNG, and the XOR elements The resulting hardware structure is high-performance without requiring arithmetic circuitry. The particular software elements that perform the functions of the LFSR RNG, CA RNG(s), and the XOR/XNOR functions are implementation dependent.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A pseudo-random number generator, comprising:
a linear feedback shift register (LFSR) to be seeded with any value and having a plurality of stages and an output port at each stage; and
a cellular automaton to be seeded with a predetermined value to not result in a sub-cycle and having a plurality of cells and an output port at each cell, wherein the LFSR has fewer stages than the cellular automaton has cells; and a plurality of logic circuit elements, each implementing a selected logic function and having a first input port coupled to an output port of a stage of the LFSR and a second input port coupled to an output port of a cell of the cellular automaton that provides one bit of the pseudo-random number over an output port wherein the cellular automaton is implemented in a programmable logic device that is a field programmable gate array and each cell in the cellular automaton is implemented with a look-up table of the field programmable gate array.

2. The pseudo-random number generator of claim 1, wherein the LFSR is implemented in the programmable logic device.

3. A pseudo-random number generator, comprising:

a linear feedback shift register (LFSR) to be seeded with any value and having a plurality of stages and an output port at each stage; and a cellular automaton to be seeded with a predetermined value to not result in a sub-cycle and having a plurality of cells and an output port at each cell, wherein the LFSR has more stages than the cellular automaton has cells; and a plurality of logic circuit elements, each implementing a selected logic function and having a first input port coupled to an output port of a stage of the LFSR and a second input port coupled to an output port of a cell of the cellular automaton that provides one bit of the pseudo-random number over an output port, wherein the LFSR has a number of stages that is equal to a number of cells of the cellular automaton, each stage of the LFSR generates one bit at an associated bit position of a first number, each cell of the cellular automaton generates one bit at an associated bit position of a second number, and each stage of the LFSR and a cell of the cellular automaton at a non-corresponding bit position are coupled to one of the logic circuit elements.

* * * * *